United States Patent [19]

Shintani et al.

[11] Patent Number: 4,992,875
[45] Date of Patent: Feb. 12, 1991

[54] STILL VIDEO CAMERA

[75] Inventors: Dai Shintani; Takeo Hoda; Toshio Yamaki; Yoshihiro Tanaka; Etsuko Nakai; Sadafusa Tsuji, all of Osaka, Japan

[73] Assignee: Minolta Camera Kabushiki Kaisha, Osaka, Japan

[21] Appl. No.: 381,519

[22] Filed: Jul. 18, 1989

[30] Foreign Application Priority Data

Jul. 18, 1988 [JP] Japan ................................ 63-178797
Sep. 30, 1988 [JP] Japan ................................ 63-246765
Sep. 30, 1988 [JP] Japan ................................ 63-246766

[51] Int. Cl.⁵ ............................................. H04N 3/14
[52] U.S. Cl. ....................................... 358/209; 358/909
[58] Field of Search ............... 358/909, 225, 906, 209, 358/48

[56] References Cited

U.S. PATENT DOCUMENTS

| 4,489,351 | 12/1984 | d'Arc ................................ 358/909 |
| 4,754,271 | 6/1988 | Edwards ............................ 358/909 |
| 4,831,452 | 5/1989 | Takanashi et al. ................. 358/225 |
| 4,887,161 | 12/1989 | Watanabe et al. ................. 358/909 |

FOREIGN PATENT DOCUMENTS

| 54-140543 | 10/1979 | Japan . |
| 60-153674 | 8/1985 | Japan . |
| 62-9289 | 1/1987 | Japan . |
| 62-11374 | 1/1987 | Japan . |

Primary Examiner—Stephen Brinich
Attorney, Agent, or Firm—Willian Brinks Olds, Hofer Gilson & Lione

[57] ABSTRACT

A still camera for recording an object image by making use of an electronic signal such as a still video camera is so constructed that a recording medium is positioned nearly in parallel with an optical axis of a taking lens system and also in the lateral direction to the taking lens system. Therefore, the camera body thereof can be formed in a flat shape, and additionally a red-eye phenomenon can be prevented from occurring by arranging a light emitting portion of an electronic flash device and the taking lens system sufficiently apart from each other.

8 Claims, 11 Drawing Sheets

STILL VIDEO CAMERA

BACKGROUND OF THE INVENTION

1. Field of the Invention

The present invention relates to a still camera for recording an object image by making use of an electronic signal such as a still video camera, and more particularly to arranging structure of constituent parts thereof.

2. Description of the Prior Art

As shown in FIG. 1, a conventional still camera for recording an object image by making use of an electronic signal such as a still video camera generally adopts such arrangement that a taking lens system 101 is so disposed that the optical axis thereof is in the horizontal direction and a disk receiving portion 102 is so disposed that a magnetic disk is loaded therein in the perpendicular position to the optical axis, and resultingly the whole camera body 100 assumes an externally undulating and large-size shape. (The numerals 103 and 104 respectively designate a viewfinder window and a release button which starts release operation of a shutter by the depression thereof.)

In pursuit of compactness of this kind of camera, it has been proposed in the Japanese Laid-Open Utility-Model Publication No. 77802/1983 that the magnetic disk is loaded in a position substantially in parallel with the optical axis of the taking lens system. However, this prior art reference only discloses that the magnetic disk is positioned below the optical axis of the taking lens system, therefore even if compactness of the camera can be attained, a flat-shaped camera can not be realized.

Additionally, as shown in FIG. 1, in the conventional still camera for recording an object image by making use of an electronic signal such as a still video camera, the disk receiving portion 102 is arranged behind the taking lens system 101, therefore the camera body 100 tends to become long in the direction along the optical axis of the taking lens system 101, on the contrary, tends to become short in the perpendicular direction to the optical axis thereof. Further, in such arranging structure, a light emitting portion of an electronic flash device (not illustrated), one end of which is directed to an object is disposed comparatively close to the taking lens system 101.

However, when the taking lens system 101 and the light emitting portion are arranged close to each other, a problem is apt to take place that a red-eye phenomenon by which pupils of a human body of the object are photographed in red is caused. In order to prevent the red-eye phenomenon from occurring, if the taking lens system 101 and the light emitting portion are arranged apart from each other in the above-described conventional structure, the space between the both becomes larger, resulting in such disadvantages as a large-sized camera body and the increase in waste space therein.

Moreover, in the case of employing a zoom lens system as the taking lens system 101, since the zoom lens system has a longer total length in the direction of the optical axis thereof, the camera body 100 also becomes longer in the same direction if the structure in which the disk receiving portion 102 is arranged behind the taking lens system 101 is adopted, which makes it difficult to form the camera body 1 in a compact size.

SUMMARY OF THE INVENTION

It is an object of the present invention to provide a still camera for recording an object image by making use of an electronic signal such as a still video camera which can be formed in a flat shape, breaking the conventional conception concerning the external form of the camera.

Another object of the present invention is to provide a still camera for recording an object image by making use of an electronic signal such as a still video camera having such arranging structure of constituent parts that the space inside the camera body can be effectively utilized.

A further object of the present invention is to prevent the external form of the camera from becoming longer in the direction of the optical axis of the taking lens system even if the zoom lens system is applied to the taking lens system.

A further another object of the present invention is not only to take such structure that the space inside the camera body is effectively utilized, but also to make the shadow of the object to be photographed inconspicuous at flashlight emission.

A still further object of the present invention is to provide a still camera for recording an object image by making use of an electronic signal such as a still video camera in which the taking lens system, light emitting portion of the electronic flash device and disk receiving portion are arranged so as to effectively utilize the space in the camera body and moreover to prevent the red-eye phenomenon from occurring.

In accordance with one feature of the present invention, a still camera for recording an object image by making use of an electronic signal is so constituted that a recording medium is positioned nearly in parallel with an optical axis of a taking lens system and also in the lateral direction to the taking lens system.

In accordance with another feature of the present invention, a still camera for recording an object image by making use of an electronic signal is so constituted that a recording medium is positioned nearly in parallel with an optical axis of a viewfinder optical system and also in the lateral direction to the viewfinder optical system..

In accordance with further feature of the present invention, a still camera for recording an object image by making use of an electronic signal comprises a taking lens system and a light emitting portion of an electronic flash device which are incorporated in a camera body in such a manner that one end portions are respectively directed to an object to be photographed, and wherein a recording medium is arranged between the light emitting portion of the electronic flash device and the taking lens system.

In accordance with further another feature of the present invention, a still camera for recording an object image by making use of an electronic signal comprises a taking lens system and a light emitting portion of an electronic flash device which are incorporated in a camera body in such a manner that one end portions are respectively directed to an object to be photographed, and wherein a recording medium is arranged behind the light emitting portion of the electronic flash device.

BRIEF DESCRIPTION OF THE DRAWINGS

These and other objects and features of the present invention will become apparent from the following description taken in conjunction with preferred embodiments thereof with reference to the accompanying drawings, throughout which like parts are designated by like reference numerals, and in which.

DETAILED DESCRIPTION OF THE PREFERRED EMBODIMENT

Hereinafter, the embodiments of the present invention will be described with reference to the drawings.

Figure 1:
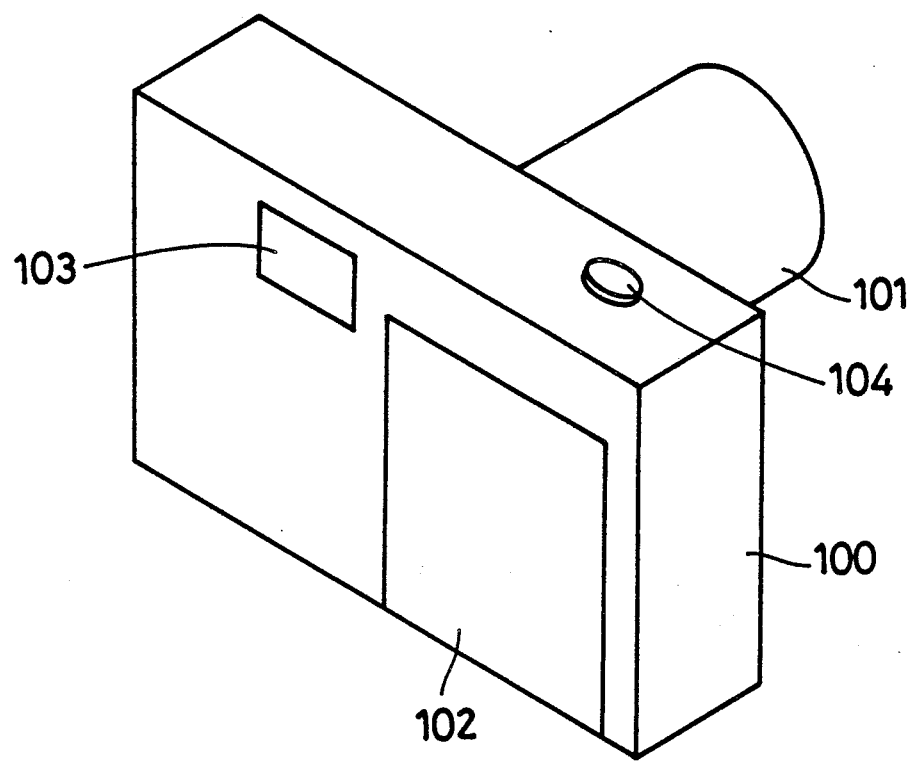
FIG. 1 is a schematic perspective view of the external appearance showing a conventional still video camera according to the prior art.
Figure 2A:
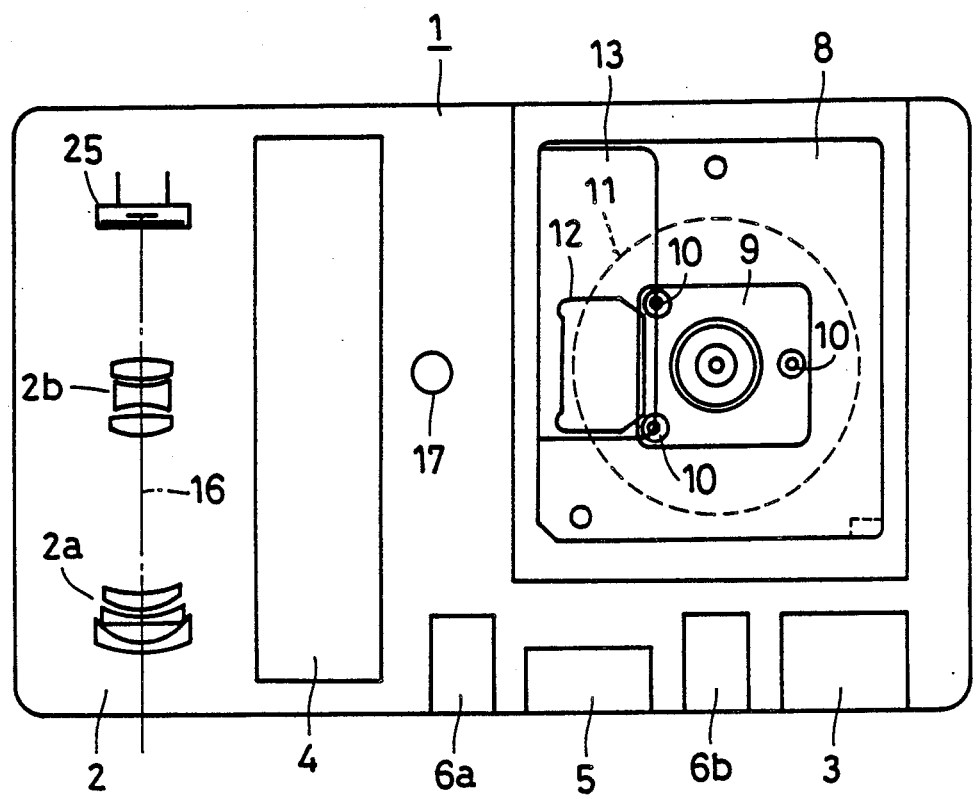
FIG. 2(a) is a schematic plan view showing a first embodiment of the still video camera according to the present invention.
Figure 2B:
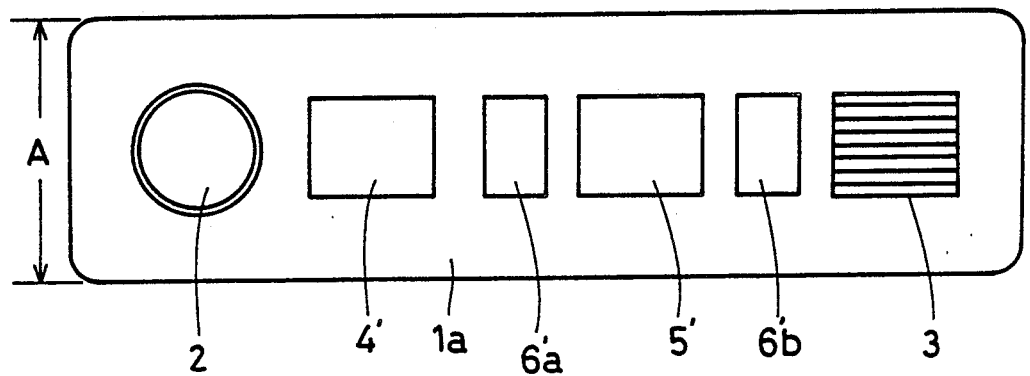
FIG. 2(b) is a front view of FIG. 2(a)

FIGS. 2(a) and 2(b) show the first embodiment of the present invention. As shown in FIGS. 2(a) and 2(b), a camera body 1 is formed in a flat-shape, wherein a taking lens system 2 having lens units 2a and 2b, a solid state image device 25 such as CCD (charge coupled device), a viewfinder optical system 4, an auto white balance unit 5, a distance measuring unit for automatic focusing constituted with a portion 6a which emits an infrared light toward an object for distance measurement and a portion 6b which receives the light reflected by the object (the functions of 6a and 6b may be exchanged), a light emitting portion 3 of an electronic flash device and a magnetic disk attaching portion 8 are respectively disposed. The magnetic disk attaching portion 8 comprises a motor 9, setscrews 10, 10, 10 for fixing the motor 9 to the camera body 1, a frame 13 having a cutaway opening 12 for directing a magnetic disk 11 to a magnetic head (not illustrated), and so on.

Figure 3:
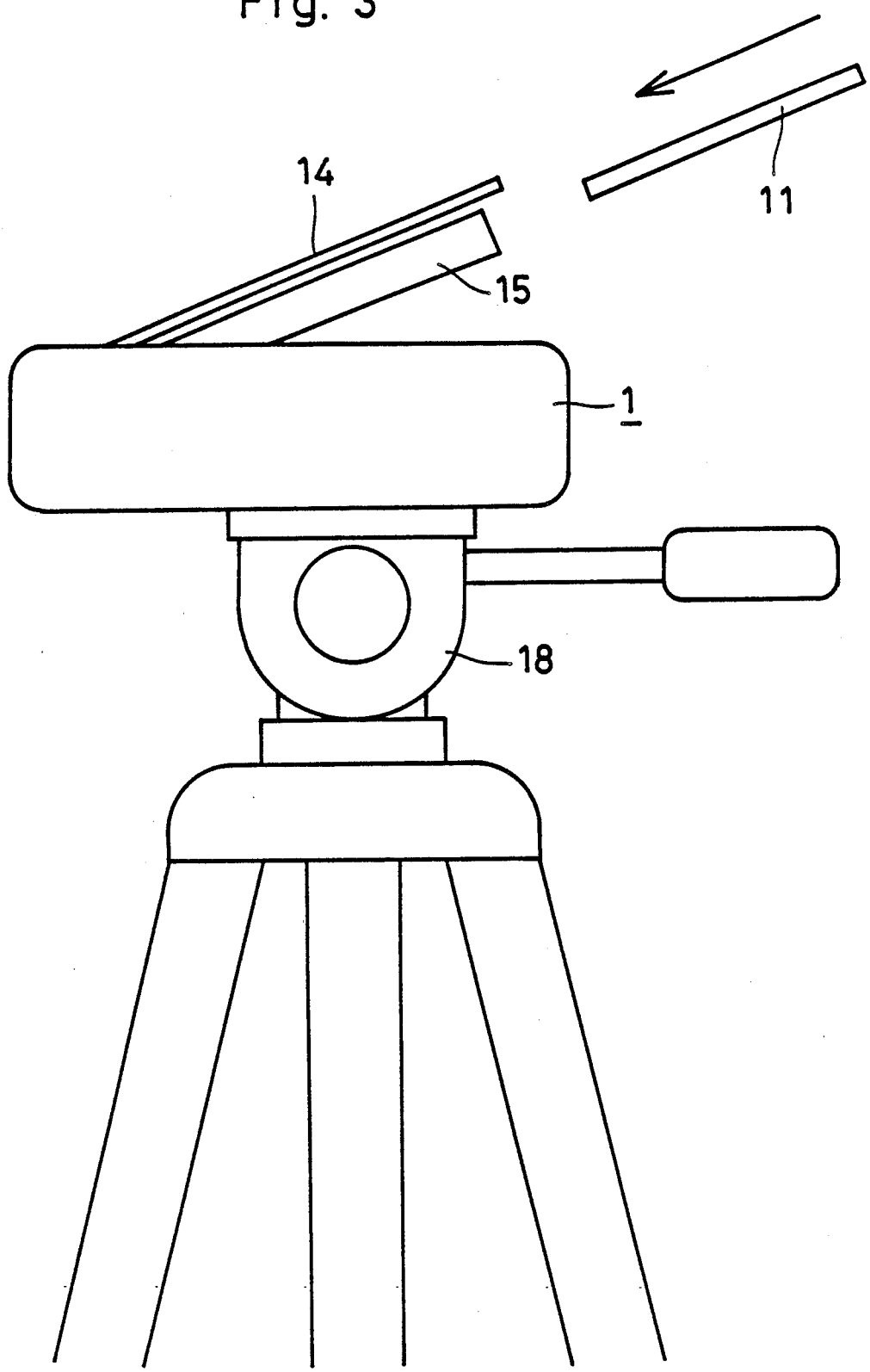
FIG. 3 is a view showing the manner in which the magnetic disk is attached to the camera body which is fixed to a tripod.

The magnetic disk 11 is, as illustrated in FIG. 3, inserted in a holder 15 integrated with an open/close lid 14, and attached to the magnetic disk attaching portion 8 by closing the open/close lid 14.

In this case, the magnetic disk 11 is arranged in parallel with an optical axis 16 of the taking lens system 2 and in addition, not in the vertical direction to the optical axis 16 but in the lateral (horizontal) direction thereto. Accordingly, an external thickness A of the camera body 1 can be reduced to the utmost, which produces good results in point of forming the camera body 1 in a shape as thin as possible.

Looking at the front surface 1a of the camera body 1, between the taking lens system 2 and the light emitting portion 3 which are arranged sufficiently apart from each other, a viewfinder window 4', windows 6' a and 6'b for distance measurement and a window 5' for auto white balancing are disposed, wherein the windows 6'a and 6'b are those for emitting light and for receiving the light reflected by the object respectively.

On the bottom of the camera body 1, a tapped hole 17 is formed so that the camera body 1 can be fixed to a tripod 18 as illustrated in FIG. 3. When the camera is, as shown in FIG. 3, so constructed that the magnetic disk 11 is inserted and removed on the upper surface of the camera body 1, the magnetic disk 11 can be extremely easily inserted and removed in the state that the camera body 1 remains fixed to the tripod 18. Even in the case where the magnetic disk 11 is designed to be inserted and removed on the side of the camera body 1 instead of the upper side, the insertion and removal of the magnetic disk 11 is performed without causing no disadvantage in the state that the camera body 1 remains fixed to the tripod 18.

Figure 4A:
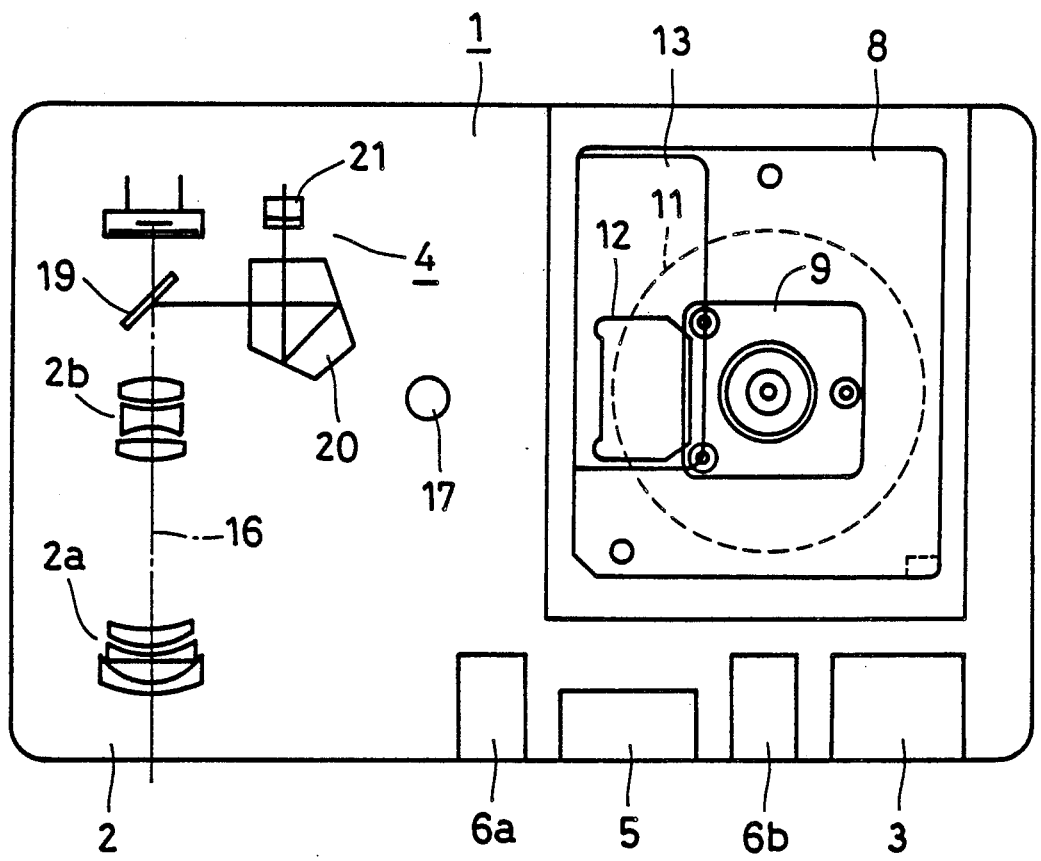
FIG. 4(a) is a schematic plan view showing a second embodiment of the still video camera according to the present invention.
Figure 4B:
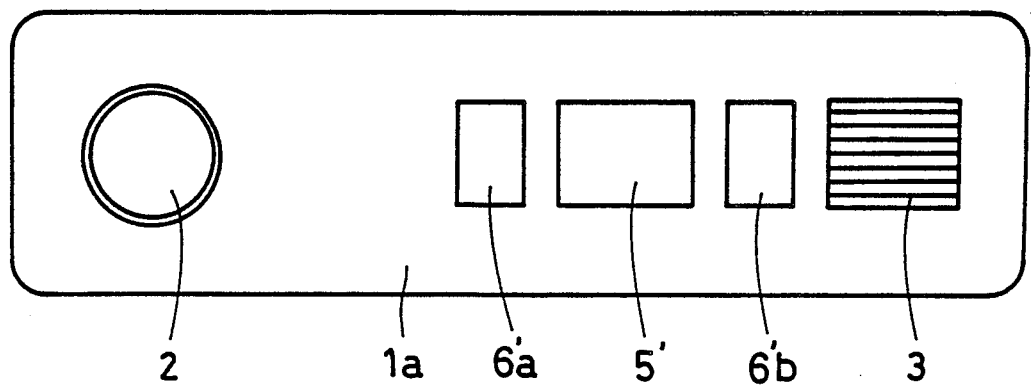
FIG. 4(b) is a front view of FIG. 4(a)

FIGS. 4(a) and 4(b) show the second embodiment which applies the viewfinder optical system 4 of single lens reflex type, wherein light passing through the taking lens system 2 is divided in the lateral (horizontal) direction by means of a mirror 19 to be led toward a pentagonal roof prism 20. Accordingly, the viewfinder optical system 4 constituted with the pentagonal roof prism 20 and an eyepiece unit 21 and so on is arranged in the lateral direction to the taking lens system 2 without protruding, which produces no reverse results to forming of a flat-shaped camera body.

According to this second embodiment, as obvious from FIG. 4(b), the viewfinder window 4' does not exist.

In FIGS. 4(a) and 4(b), and FIGS. 5(a) and 5(b) described below, the same members as those in FIGS. 2(a) and 2(b) are indicated by the same reference numerals, and thereby overlapped description is omitted.

Next, the third embodiment of the present invention will be described with reference to FIGS. 5(a) and 5(b). These figures show the case of applying a TTL (through the lens)-type focus condition detecting unit for automatic focusing, wherein the light passing through the taking lens system 2 is divided in the lateral direction by means of a mirror 22 to be led toward a focus condition detecting device 23. Therefore, since the focus condition detecting device 23 can be arranged in the lateral direction to the optical axis 16 of the taking lens system 2, the camera body 1 is not prevented from being formed in a flat shape. According to this third embodiment, the windows 6'a and 6'b for distance measurement are inevitably deleted as obvious from FIG. 5(b).

In accordance with the above-described three embodiments, it is possible to obtain such a desired effect that the body 1 of the still video camera can be formed in a flat shape. Additionally, in the case where the flashlight emitting function is actuated, the red-eye phenomenon can be prevented from occurring as the taking lens system 2 and the light emitting portion 3 of the electronic flash device are installed sufficiently apart from each other.

Furthermore, in the case where the single lens reflex viewfinder optical system or the TTL-type focus condition detecting unit for automatic focusing is employed, if the light passing through the taking lens system 2 is designed to be divided in the lateral direction to be led toward the viewfinder optical system 4 or the focus condition detecting device 23 respectively which receives the divided light, the view finder optical system 4 or the focus condition detecting device 23 can be arranged in the lateral direction to the taking lens system 2, therefore such arrangement serves the purpose of forming the whole camera body 1 in a flatter shape.

Figure 6:
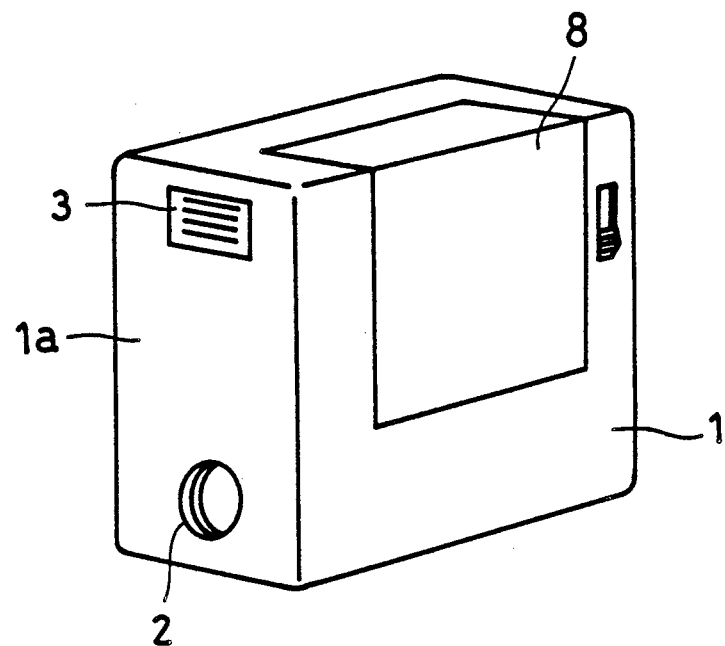
FIG. 6 is a schematic perspective view of the external appearance showing a fourth embodiment of the still video camera according to the present invention.
Figure 7:
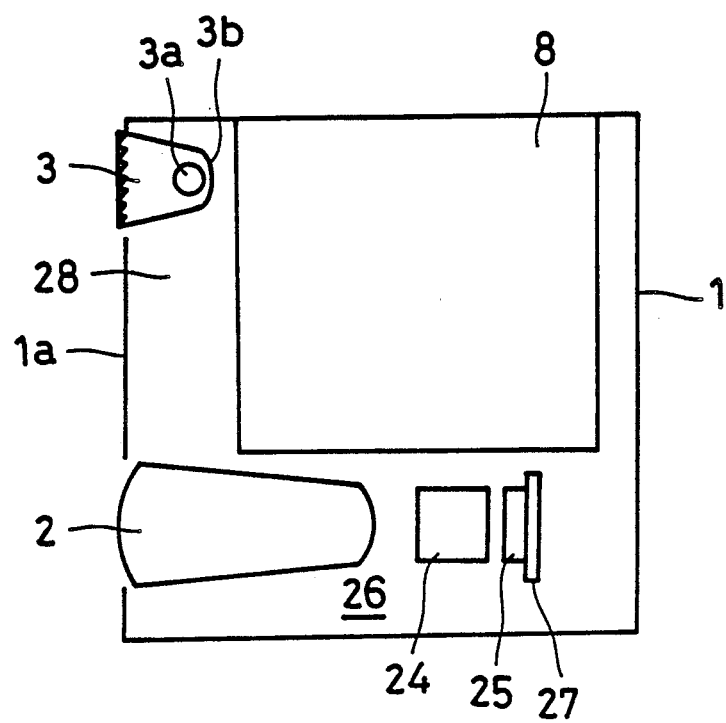
FIG. 7 is a schematic vertical sectional view of FIG. 6.

Next, the fourth embodiment of the present invention will be described with reference to FIGS. 6 and 7. FIG. 6 shows perspectively the external appearance of the still video camera according to the present embodiment, and FIG. 7 schematically shows the same in section. In this embodiment, on a front surface 1a of the box-like camera body 1 having almost no undulations, one end of the taking lens system 2 and one end of the light emitting portion 3 of the still video camera are revealed downward and upward respectively. The light emitting portion 3 of the electronic flash device is equipped with a xenon tube 3a and a reflector 3b. The magnetic disk attaching portion 8 is arranged behind the light emitting portion 3, and below the magnetic disk attaching portion 8, a photographing system 26 constituted with the taking lens system 2, an optical low pass filter 24 and the solid state image device 25 is arranged.

Figure 8:
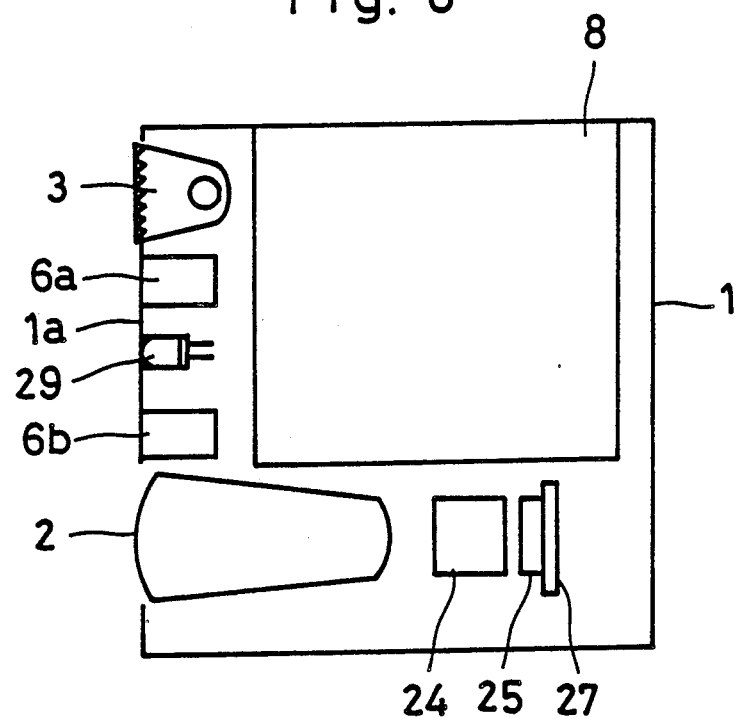
FIG. 8 is a schematic vertical sectional view showing a modification example of the fourth embodiment.

In this embodiment, the zoom lens system having a longer total length in the direction of the optical axis thereof is adopted as the taking lens system 2. The solid state image device 25 consists of the CCD or a MOS·IC (metal oxide semiconductor·integral circuit) and is held by a substrate 27. The magnetic disk attaching portion 8 consists of, not illustrated, a gain control circuit for controlling gain of an output signal from the solid state image device 25, a signal processing circuit for performing signal processings such as γ-correction, color signal separation, white balancing, matrix between a color difference signal and a luminance signal, modulation, synthesis, etc., a recording portion including a recording means for recording the signal after signal processing on the magnetic disk 11 (see FIGS. 2(a), 4(a) and 5(a)), and the motor 9 (see the same figures), and so on. According to this embodiment, in a space 28, which is formed between the taking lens system 2 and the light emitting portion 3 in FIG. 7, for example, a control circuit for controlling the electronic flash device and-/or a capacitor for storing power to emit the flashlight may be disposed, otherwise, as shown in FIG. 8, the active type distance measuring unit for automatic focusing constituted with the two portions 6a and 6b and a light receiving device 29 for photometry may be so disposed that the respective one end portions are revealed on the front surface 1a. In the above-mentioned distance measuring unit, the portions 6a and 6b are constituted so as to emit the light for distance measurement and receive the light reflected by the object respectively. (The functions of the portions 6a and 6b may be exchanged.)

Figure 9:
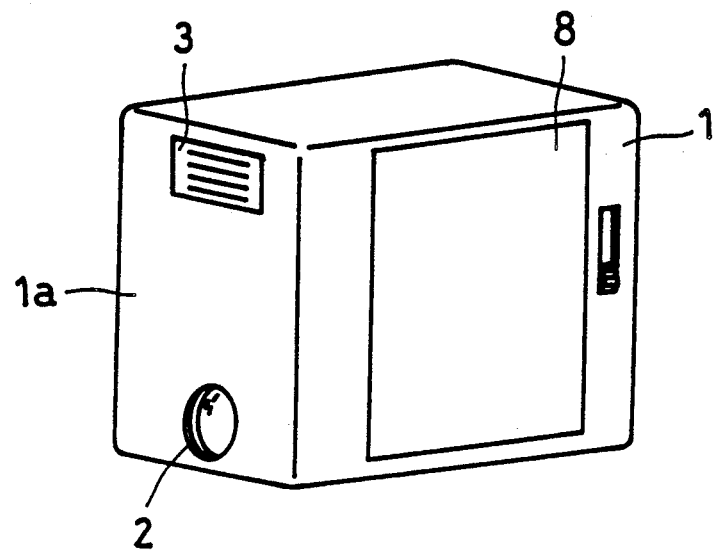
FIG. 9 is a schematic perspective view of the external appearance of a fifth embodiment of the still video camera according to the present invention.
Figure 10:
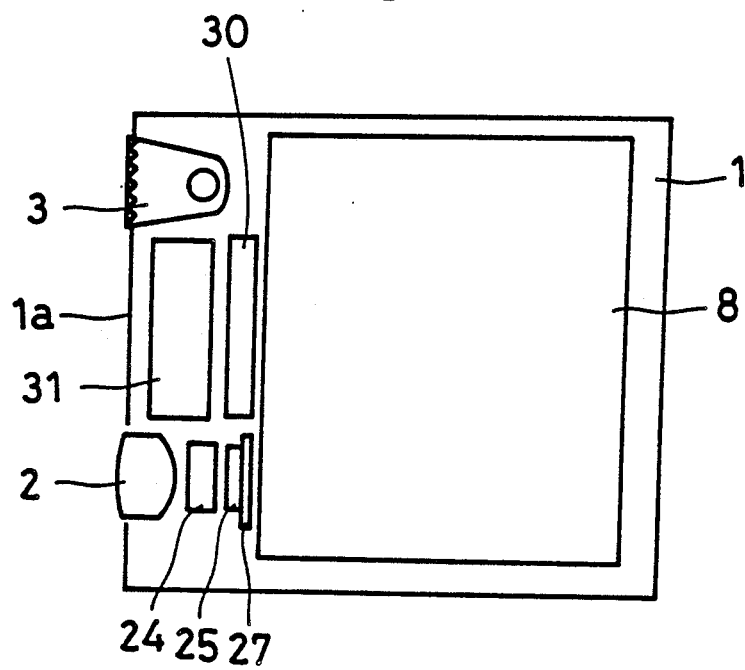
FIG. 10 is a schematic vertical sectional view of FIG. 9.

Next, the fifth embodiment of the present invention will be described with reference to FIGS. 9 and 10. This embodiment shows the case where a lens system having a short total length in the direction of the optical axis thereof is employed in place of the zoom lens system as the taking lens system 2. Accordingly, this embodiment differs from the above-described fourth embodiment as shown in FIGS. 6 to 8 in that the taking lens system 2 is arranged not below but before the magnetic disk attaching portion 8. In this case, the optical low pass filter 24 and the solid state image device 25 are also arranged before the magnetic disk attaching portion 8. In this embodiment, the light emitting portion 3 of the electronic flash device and the taking lens system 2, which are both arranged before the magnetic disk attaching portion 8, are disposed sufficiently apart from each other so as not to cause the red-eye phenomenon. In FIG. 10, the numerals 30 and 31 designate a capacitor for storing power to emit the flashlight and a control circuit for controlling the electronic flash device respectively.

According to the above-described fourth and fifth embodiments, the magnetic disk attaching portion 8 is arranged so as to take the shape having a large length in the direction along the optical axis of the taking lens system 2 and a small length in the lateral direction to the taking lens system 2, thereby the whole of the camera body 1 similarly assumes such a shape that its depth is longer than its width. On the contrary, the camera body 1 may be formed in a shape having a large width and a small depth by reducing the size of the magnetic disk attaching portion 8 in the direction along the optical axis of the taking lens system 2 and enlarging it in the lateral direction to the taking lens system 2.

Figure 11:
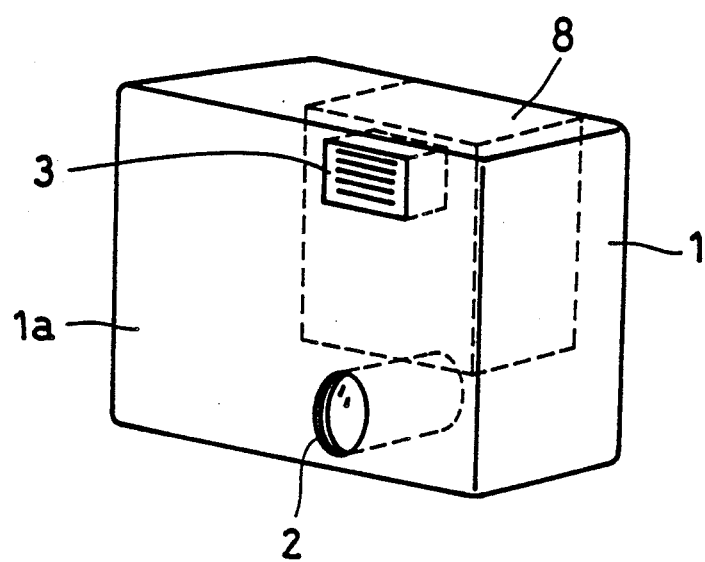
FIG. 11 is a schematic perspective view showing a sixth embodiment of the still video camera according to the present invention.
Figure 12:
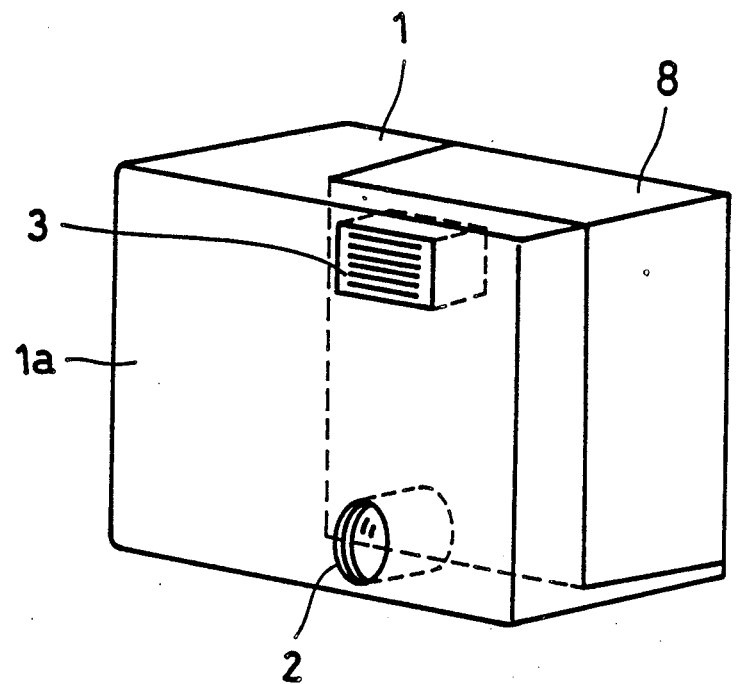
FIG. 12 is a schematic perspective view showing a seventh embodiment of the still video camera according to the present invention.

FIGS. 11 and 12 show the sixth and seventh embodiments, to which the arranging structures as described in the fourth and fifth embodiments are respectively applied in the camera body 1 having a larger width and a smaller depth. For example, in FIG. 11, the arranging structure as shown in FIGS. 6 and 7 is adopted relating to the taking lens system 2, the light emitting portion 3 of the electronic flash device and the magnetic disk attaching portion 8, on the other hand, in FIG. 12, the arranging structure as shown in FIGS. 9 and 10 is adopted. Note that in FIGS. 11 and 12, the other functional means (for example, the solid state image device, the distance measuring unit for automatic focusing and so on) are omitted to be illustrated.

In the above-described fourth to seventh embodiments, the space behind the light emitting portion 3 can be effectively utilized owing to the arrangement of the magnetic disk attaching portion 8 therein. Further, the taking lens system 2 is positioned below the magnetic disk attaching portion 8 in the fourth and sixth embodiments as shown in FIGS. 6, 7, 8 and 11, which brings about an advantage in the case of employing the zoom lens system having a relatively long total length as the taking lens system 2. While, in the fifth and seventh embodiments as shown in FIGS. 9, 10 and 12, the taking lens system 2 is positioned before the magnetic disk attaching portion 8, which brings about an advantage from the viewpoint of the pursuit of the compactness of the camera body 1 when the zoom lens system is not employed as the taking lens system 2. Note that the taking lens system 2 and the light emitting portion 3 of the electronic flash device are designed to be arranged apart from each other by a sufficient distance in all of the above-described embodiments so as to prevent the red-eye phenomenon from occurring. Additionally, in each of the above-described fourth to seventh embodiments, the light emitting portion 3 of the electronic flash device is nearly right above the taking lens system 2, therefore it becomes possible to make the shadow of the object at flashlight emission inconspicuous.

According to the above-described first to seventh embodiments, the space behind the light emitting portion 3 of the electronic flash device is effectively utilized, and resultingly the compactness of the camera body 1 can be attained. In addition, when the taking lens system 2 is arranged in the space below the magnetic disk attaching portion 8, an effect is produced that the size of the camera body 1 is not necessary to be lengthened in the direction of the optical axis 16 of the taking lens system 2 even in the case of adopting a lens system having a relatively long total length in the axial direction like the zoom lens system as the taking lens system 2. While, when a lens system having a relatively short total length is adopted, the height of the camera body 1 can be reduced by arranging the taking lens system 2 before the magnetic disk attaching portion 8. Furthermore, a desirable effect can be obtained that the shadow of the object to be photographed at flashlight emission is made inconspicuous by arranging the light emitting portion 3 of the electronic flash device nearly right above the taking lens system 2.

Figure 13:
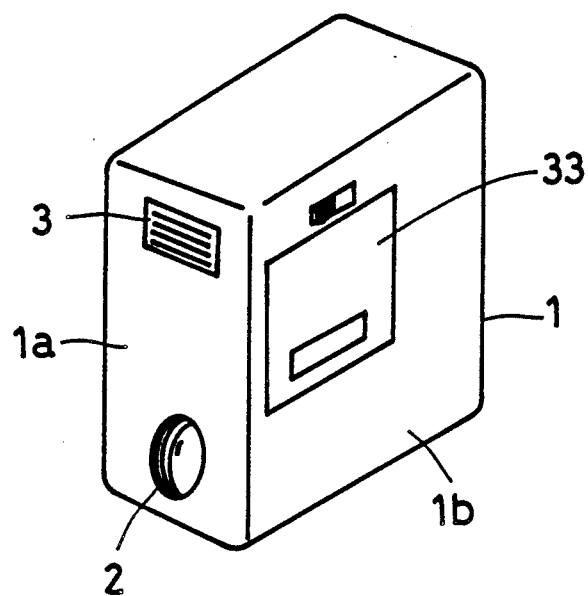
FIG. 13 is a schematic perspective view of the external appearance showing an eighth embodiment of the still video camera according to the present invention.
Figure 14:
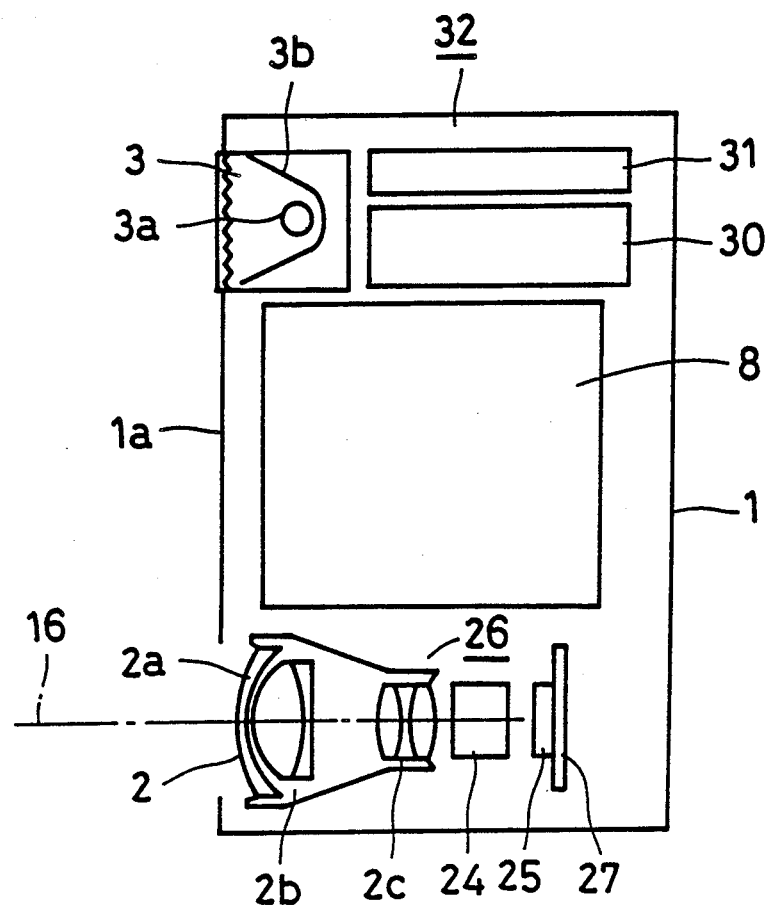
FIG. 14 is a schematic vertical sectional view of FIG. 13.

Next, the eighth embodiment of the present invention will be described. FIG. 13 perspectively shows the external appearance of the still video camera according to the present embodiment, and FIG. 14 schematically shows the same in section. In this embodiment, on the front surface 1a of the box-like camera body 1 having almost no undulations, one end of the taking lens system 2 and one end of the light emitting portion 3 of an electronic flash device 32 are revealed downward and upward respectively. Behind the taking lens system 2 comprising lens units 2a, 2b and 2c, the optical low pass filter 24 and the solid state image device 25 are disposed on the optical axis 16. The solid state image device 25 consists of the CCD, the MOS-IC or the like and held by the substrate 27. The photographing system 26 is constituted with the above-mentioned taking lens system 2, optical low pass filter 24 and solid state image device 25.

The light emitting portion 3 is equipped with the xenon tube 3a and the reflector 3b. Behind the light emitting portion 3, the control circuit 31 for controlling the electronic flash device and the capacitor 30 for storing the power to emit the flashlight are arranged upward and downward respectively. The electronic flash device 32 consists of the above-described light emitting portion 3, control circuit 31 and capacitor 30. The space formed between the electronic flash device 32 and the photographing system 26 is advantageously occupied by arranging the magnetic disk attaching portion 8.

Figure 5A:
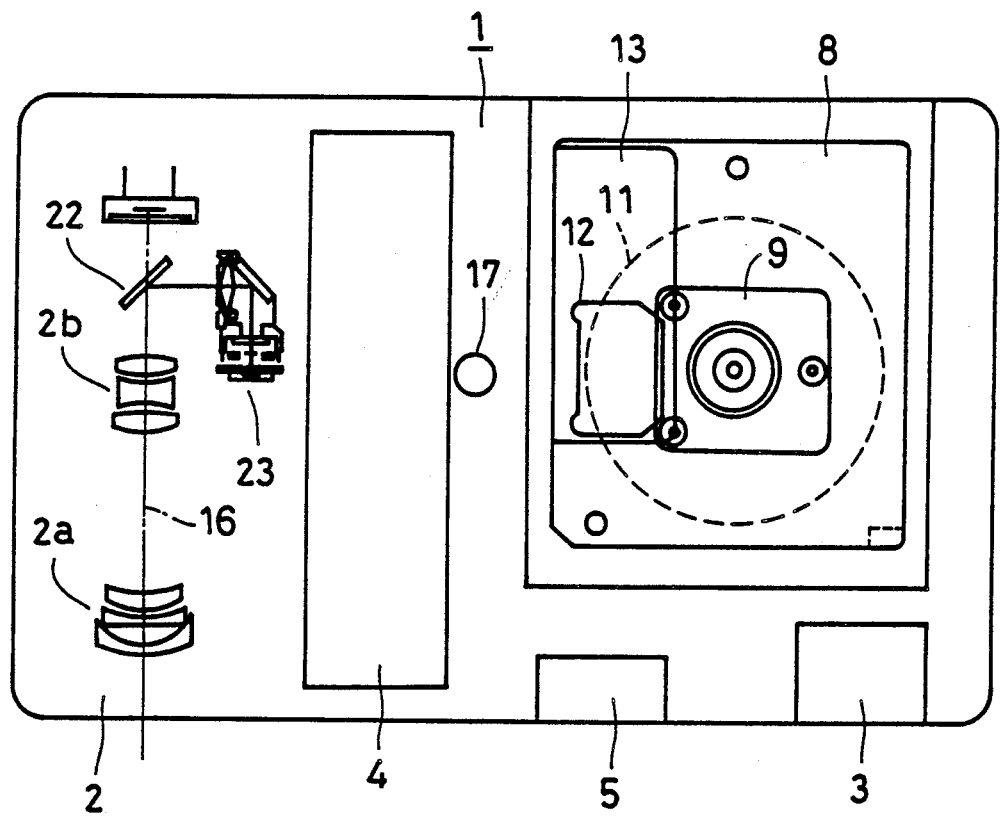
FIG. 5(a) is a schematic plan view showing a third embodiment of the still video camera according to the present invention.
Figure 5B:
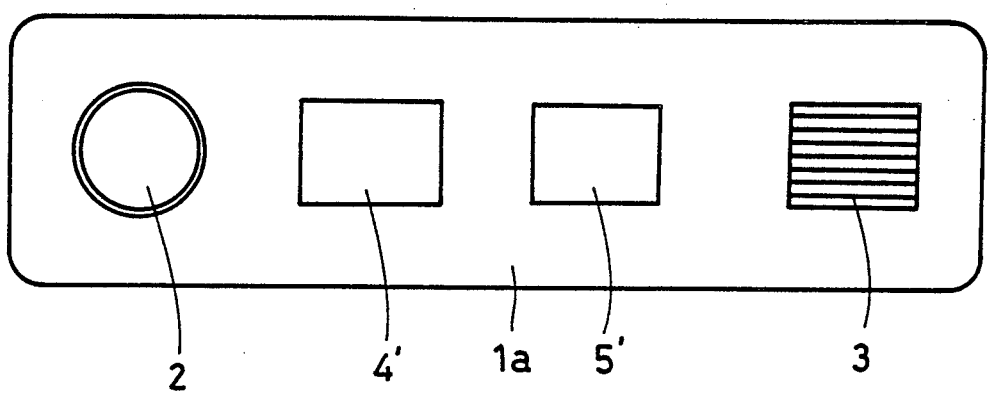
FIG. 5(b) is a front view of FIG. 5(a)

The magnetic disk attaching portion 8 includes, not illustrated, as similar to the above-described respective embodiments, the gain control circuit for controlling the gain of the output signal from the solid state image device 25, the signal processing circuit for performing the signal processings such as the γ-correction, color signal separation, white balancing, matrix between the color difference signal and the luminance signal, modulation, synthesis, etc., and the recording portion having the recording means for recording the signal after signal processing on the magnetic disk 11 (see FIGS. 2(a), 4(a) and 5(a)) and the motor 9 (see the same figures). In FIG. 13, on a one side surface 1b of the camera body 1, an open/close lid 33 is installed for receiving the magnetic disk 11 in the magnetic disk attaching portion 8.

Figure 15:
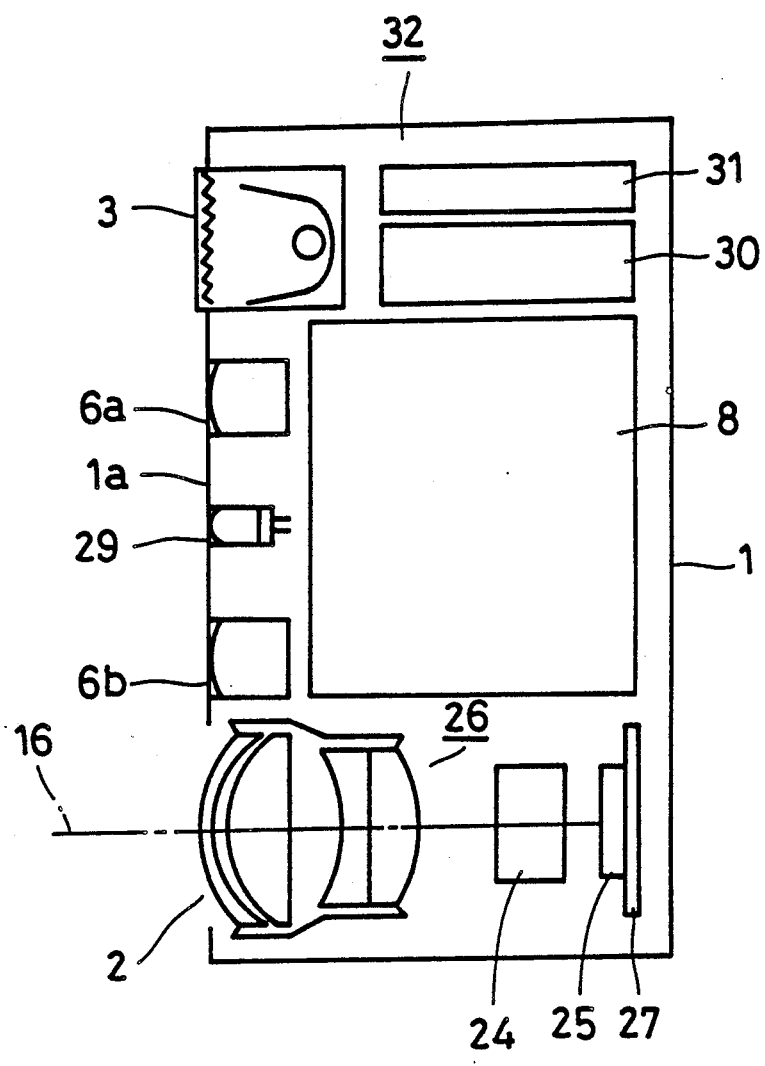
FIG. 15 a schematic vertical sectional view showing a ninth embodiment of the still video camera according to the present invention.

According to the following ninth embodiment as shown in FIG. 15, the magnetic disk attaching portion 8 is brought a little nearer to the back, and thereby in the space spread before the magnetic disk attaching portion 8, the distance measuring unit for automatic focusing constituted with the two portions 6a and 6b and the light receiving device 29 for photometry are so disposed that the respective one end portions are revealed on the front surface 1a of the camera body 1. The two portions 6a and 6b constituting the distance measuring unit for automatic focusing play roles of emitting the light for distance measurement and receiving the reflected light thereof respectively. (The functions of the two portions 6a and 6b may be exchanged.) The ninth embodiment has the same constitution relating to the photographing system 26 and the electronic flash device 32 as the eighth embodiment shown in FIG. 14, therefore the description thereof is omitted by giving the same reference numerals to the same members as those in FIG. 14.

In accordance with the eighth and ninth embodiments as described above, the magnetic disk attaching portion 8 is disposed between the taking lens system 2 and the electronic flash device 32, resulting in the useful and effective arranging structure without wasting the space in the camera body 1. Furthermore, since the taking lens system 2 and the light emitting portion 3 of the electronic flash device 32 is disposed sufficiently apart from each other, an effect is produced that the red-eye phenomenon can be prevented from ocurring. In this case, another effect can be expected that the shadow of the object to be photographed is made inconspicuous by arranging the light emitting portion 3 of the electronic flash device 32 nearly right above the taking lens system 2.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. A still camera for recording an object image by making use of an electronic signal wherein a recording medium is positioned nearly in parallel with an optical axis of a taking lens system and also in the lateral direction to said taking lens system.

2. A still camera as claimed in claim 1, whose camera body incorporating said taking lens system and said recording medium is formed in a flat shape, and wherein a taking lens and a light emitting portion of an electronic flash device are arranged on the front surface of said camera body separately from each other by a predetermined distance.

3. A still camera as claimed in claim 1, wherein a viewfinder optical system is arranged between said recording medium and said taking lens system.

4. A still camera as claimed in claim 1, wherein a focus condition detecting device is arranged before said recording medium.

5. A still camera as claimed in claim 1, wherein the light emitting portion of the electronic flash device is arranged before said recording medium.

6. A still camera as claimed in claim 1, wherein the focus condition detecting device is arranged between said recording medium and said taking lens system.

7. A still camera as claimed in claim 1, wherein a white balance detecting device is arranged before said recording medium.

8. A still camera for recording an object image by making use of an electronic signal wherein a recording medium is positioned nearly in parallel with an optical axis of a viewfinder optical system and also in the lateral direction to said viewfinder optical system.

* * * * *